United States Patent [19]

Fetzer et al.

[11] 4,037,730
[45] July 26, 1977

[54] PRESS LINE WITH WORKPIECE FEEDING DEVICE

[75] Inventors: Helmut Fetzer; Franz Schneider; Helmut Braitinger, all of Goppingen, Germany

[73] Assignee: L. Schuler GmbH, Germany

[21] Appl. No.: 566,194

[22] Filed: Apr. 9, 1975

[30] Foreign Application Priority Data

Apr. 9, 1974 Germany .............................. 2417131

[51] Int. Cl.² ............................................ B65G 47/90
[52] U.S. Cl. .................................. 214/1 BB; 214/1 Q; 212/11; 100/215; 214/1 BD
[58] Field of Search ..................... 214/1 B, 1 BS, 1 R, 214/1 BB, 1 BT, 1 BC, 1 BH, 1 BD, 1 BV, 1 S, 1 Q; 212/11

[56] References Cited

U.S. PATENT DOCUMENTS

| | | | |
|---|---|---|---|
| 2,792,953 | 5/1957 | King | 214/146.5 |
| 2,943,750 | 7/1960 | Sehn et al. | 214/1 BB |
| 3,179,262 | 4/1965 | Carlson, Sr. et al. | 214/1 BT X |
| 3,233,751 | 2/1966 | Bannon | 214/1 BB |
| 3,302,768 | 2/1967 | Cooper | 214/1 Q X |
| 3,667,114 | 6/1972 | Smith et al. | 214/1 BB X |
| 3,732,989 | 5/1973 | Cagle | 214/1 BB X |
| 3,854,889 | 12/1974 | Lemelson | 214/1 BB X |
| 3,884,363 | 5/1975 | Ajlouny | 214/1 BB |
| 3,891,204 | 6/1975 | Mager | 214/1 BB X |

Primary Examiner—Frank E. Werner
Attorney, Agent, or Firm—Craig & Antonelli

[57] ABSTRACT

A press line having a transfer system for transferring workpieces from a processing station of one press to a processing station of a subsequent press. The transfer system includes a track extending over the entire interspace between the two successive presses and a single transfer slide mounted for horizontal movement along the track. At least one pair of grippers pointing in opposite directions is mounted on the slide and a single storage station is provided between the two successive presses with a drive being provided which controls the movement of the slide in accordance with the travel path thereof.

14 Claims, 6 Drawing Figures

U.S. Patent July 26, 1977 4,037,730
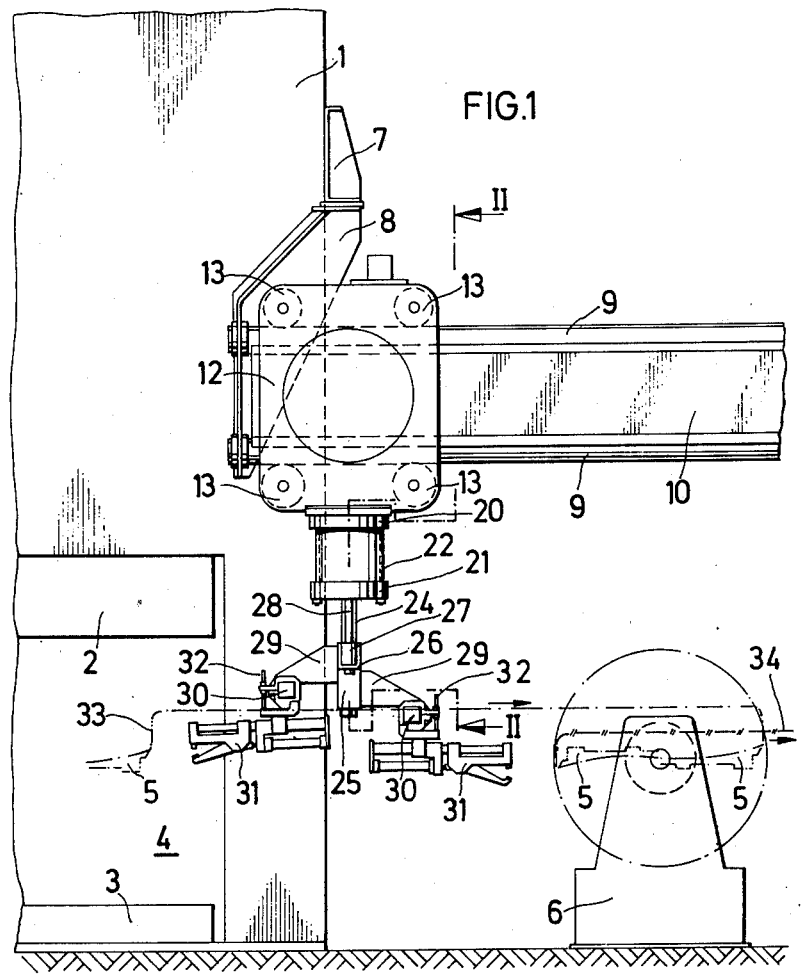

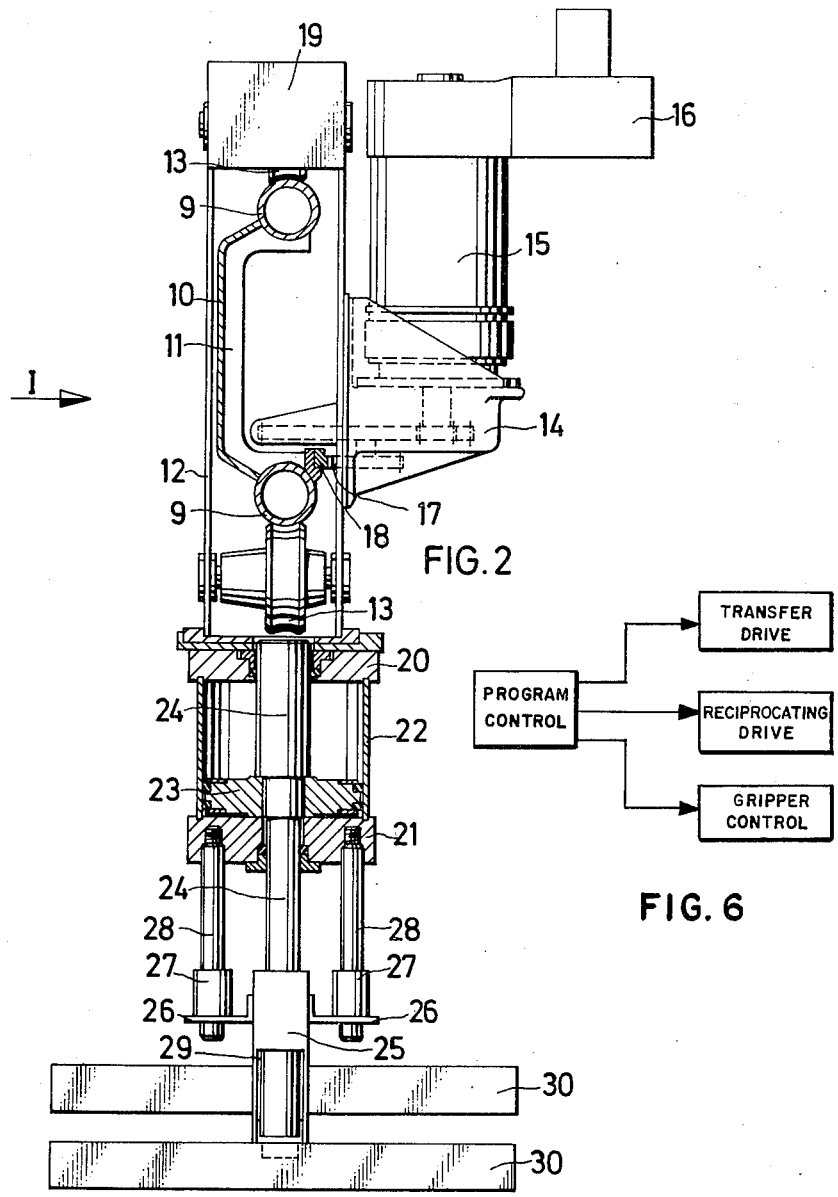

PRESS LINE WITH WORKPIECE FEEDING DEVICE

The present invention relates to a press line with a transfer system serving for the transferring of workpieces from one processing station in a press to a processing station in a subsequent press. The transfer system includes grippers arranged at transfer slides and pointing in pairs into opposite directions with the grippers being movable together in a horizontal direction and capable of being lifted and lowered and being operable in a controlled fashion. The transfer system also includes depositories or storage stations for the workpieces arranged between the presses.

In a conventional press line of this type [DOS (German Unexamined Laid-Open Application) No. 1,463,080, FIG. 18 which corresponds to U.S. Pat. Nos. 3,199,439 and 3,199,443], two tracks for respectively one transfer slide each extending over approximately half the distance between the presses and mounted in respectively one supporting bracket are arranged on the mutually facing sides of two successive presses, and three storage stations for the workpieces are provided in the zone constituting the distance between the presses. The driving, lifting, displacing, and operating movements of the transfer slides and grippers are derived from the press drives and effect the transportation of the workpieces by means of the first transfer slide from the processing station in the first press to the first storage or idle station and from there to the second storage station. By means of the second transfer slide, the workpieces are transferred from the second storage station to the third storage station and from there into the processing station in the second press. An essential disadvantage of this conventional arrangement resides in the difficulties resulting in case of necessary adaptations of the sequences of movement to varying tool sets and workpieces as well as the coordinating of the movements of both transfer slides and the sequences of movement of these slides with respect to the second storage station fed by the first transfer slide and serving as the delivery station to the second transfer slide. These difficulties are based primarily on the fact that mechanical drive connections between the press drives and the driving, lifting, displacement, and operating motions of the transfer slides and grippers exist which can only be changed by exchanging gear elements of the drive connections.

It is therefore an object of the present invention to simplify the transportation of the workpieces and the changing of the motion sequences serving for this purpose, while avioding the disadvantages inherent in the conventional press lines.

In accordance with the present invention, there is provided, in a press line of the above-mentioned type, a single transfer slide moveable horizontally along a track extending over the entire interspace between two successive presses and having at least one pair of grippers pointing into opposite directions mounted to the slide so that the grippers can be lifted and lowered; a single storage station disposed between two successive presses; a drive mechanism controllable in dependence on the travel path for the transfer slide and a reciprocating mechanism controllable in dependence on the travel path for the grippers; and a program control mechanism with a variable program is provided for the drive mechanism, the reciprocating mechanism and the operating of the grippers.

Special advantages of the press line according to the present invention also reside in that it is possible, by means of the program control mechanism, to preset any desired motion sequences and that there is no direct, mechanically coupled dependence of these motion sequences on the press drives, so that the device for transporting the workpieces can also be employed for linking presses to automated press lines wherein there are no means at the existing presses for deriving the motion sequences from the press drives. The program control can, in this connection, also affect the velocities of the drive mechanism, the reciprocating drive mechansim, and the operating mechanism for the grippers.

The following advantageous possibilities exist, in particular, for constructing the drive mechanism. On the one hand, the drive mechanism may include a controllable motor driving at least one cogwheel or gear arranged within the slide and meshing with at least one rack extending along the track and being fixedly mounted. On the other hand, the drive mechanism may include a controllable motor driving at least one feed screw nut arranged within the transfer slide, this nut being arranged on a spindle extending along the track and being nonrotatably mounted. Alternatively, the drive mechanism may include a controllable motor exerting a rotating drive on at least one spindle extending along the track and a feed screw nut mounted within the transfer slide being supported on this spindle. According to another feature of the invention, the drive mechanism may be constructed as a controllable linear electric motor, one part of which extends along the track and is firmly attached and the other part of which is mounted at the transfer slide. In this connection, constructions are especially advantageous wherein the motor of the drive mechanism or the part thereof which is to be controlled is arranged on the transfer slide, because this makes it possible to effect the control of all motion sequences of the device for the transportation of the workpieces on the transfer slide.

If the machining of the workpieces in the two successive presses is to be conducted, on the one hand, in one position and, on the other hand, in the reverse position, it is advantageous according to a feature of the invention to fashion the storage station as a turning device, wherein the program control mechanism also controls the turning device.

In accordance with another feature of the press line of the present invention, the grippers are attached with adjustable inclination with respect to the conveying direction to the liftable and lowerable part of the transfer slide and are furthermore, in the optionally inclined position, arranged by means of drives to be displaceable with respect to this part of the transfer slide, and additionally are controllable by the program control in this arrangement. This facilitates the simultaneous seizing and depositing of workpieces by grippers pointing in opposite directions. In this connection, the actuation of the grippers and their displacement with respect to that part of the transfer slide can be derived from a single drive and can commonly be controllable by the program control mechanism, since the actuation and displacement of the grippers generally need not be effected independently of each other.

Another advantageous feature of the press line according to the present invention resides in that operating means to vary the program-controlled inclination with respect to the conveying direction are in engagement with the grippers. The actuation of the grippers and the operating means for varying their inclination can be controllable by the program control mechanism in mutual dependency, since the controlled variation of the inclination of the grippers generally serves merely for adapting, during the seizing and depositing of the workpieces, the motion sequence of the gripper elements of the grippers to the given and/or required shape and position of the workpieces.

These and other objects, features and advantages of the present invention will become more apparent from the following description when taken in connection with the accompanying drawings wherein:

FIG. 1 shows a lateral view in the direction of arrow I in FIG. 2 of one section of the press line, wherein the forward portion of the press frame, as seen in the viewing direction, has been omitted;

FIG. 2 shows a section along line II-II in FIG. 1 on an enlarged scale, wherein the press and the grippers have been omitted;

FIG. 3 is a schematic representation of another drive arrangement;

FIG. 4 is a schematic representation of another drive arrangement;

FIG. 5 is a schematic representation of a further drive arrangement; and

FIG. 6 is a schematic representation of the program control mechanism for controlling various components.

Referring now to the drawings, there is shown in FIG. 1, a press 1 with a press ram 2, a press table 3 and a press working space 4 containing the tool set — not shown in the drawing, which press is linked to a subsequent, for example, identical press —(not shown in the drawing) by the system for transporting the workpieces 5 bridging the entire interspace between the two presses and comprising in the center of the interspace a storage station, fashioned as a turning device 6, for the workpieces 5. A crossrail 7 extending at right angles to the conveying direction is respectively mounted on the end face of the frame of press 1 and correspondingly on the end face of the frame of the subsequent press and respectively one supporting element 8 is attached to the central section of each crossrail and has the shape of a housing. Between the supporting elements 8 arranged on the mutually facing ends of press 1 and of the subsequent press extend two superimposed tubular girders 9 mounted in the supporting elements 8 and interconnected by a web plate 10 and several reinforcing panels 11 distributed over the length of the tubular girders 9. The girders 9 together form the track for the transfer slide 12.

Four running rollers 13 are rotatably arranged in the transfer slide 12, the two upper rollers rolling along the topside of the upper tubular girder 9 and the two lower rollers running along the underside of the lower tubular girder 9. On the side of the transfer slide 12 facing away from the web plate 10, a gearbox 14 (FIG. 2) is attached to the slide with a controllable motor 15 and a cooling fan 16 being flanged to the top of the gearbox. The motor 15 serves as the drive mechanism and drives, via a gear transmission system accommodated in the gearbox 14, a gear wheel 17 mounted in the gearbox 14, which gear wheel meshes with a rack 18 extending along the track and attached to the lower tubular girder 9 and the reinforcing panels 11.

The drive mechanism may also be in the form of a controllable motor 45 driving at least one feed screw nut 46 provided in the transfer slide 12 with the nut 46 being supported in a spindle 47 extending along the girder 9 and being nonrotatably mounted as illustrated schematically in FIG. 3. Alternatively, the drive mechanism may include a controllable motor 50 exerting a rotating drive on at least one spindle 51 extending along a girder 9 with a feed screw nut 52 mounted within the transfer slide 12 being supported on the spindle as illustrated schematically in FIG. 4. Additionally, the drive mechanism may be constructed as a controllable linear electric motor 55, one part of which 55a extends along a girder 9 and being fixedly arranged with the other part 55b being mounted on the transfer slide 12 as illustrated schematically in FIG. 5.

While the topside of the transfer slide 12 provided with a cover 19, the transfer slide 12 carries on its underside a cylinder-piston unit serving as the reciprocating drive mechanism. The cylinder of this unit as shown in FIG. 2 includes an upper end wall 20, a lower end wall 21, and a peripheral wall 22 and is mounted to the conveyor slide 12. The piston 23 which is displaceable in the cylinder is guided by the piston rod 24 and a supporting element 25 is attached to the lower end of this piston rod. The support-element 25 is provided with angle sections 26 with guide sleeves 27, projecting on both sides at right angles to the conveying direction which sleeves cooperate with guide pins 28 attached to the lower end wall 21 of the cylinder. Furthermore, supporting brackets 29 projecting in the conveying direction are mounted on both sides to the supporting element 25 with each bracket carrying a crossbeam 30 on its underside. The grippers 31 (FIG. 19 pointing into opposite directions are located at the crossbeams 30 on the undersides thereof and several of such grippers can be arranged mutually in parallel on each crossbeam 30.

The coupling of the crossbeams 30 with the grippers 31 furthermore includes respectively one adjusting spindle 32 for adjusting the inclination of the grippers 31 with respect to the conveying direction and also a drive means for shifting the grippers 31 in their longitudinal direction with respect to the crossbeams 30 and, drives for the operation of the grippers 31 are provided at the latter. The grippers 31 may be of the type illustrated in U.S. Pat. Nos. 3,371,953 and 3,567,208 having drive and operating devices therefor constructed in a manner known in the art. The operation of the grippers 31 and their displacement with respect to the element 25 may be derived from a single drive controllable by the program control mechanism.

The grippers 31 pointing into the direction of the press 1 impart to the workpieces 5 a movement along the track 33 (shown in dashed-dot line in FIG. 1) from the press 1 to the turning device 6, while the grippers 31 pointing into the direction toward the subsequent press impart to the workpieces 5 a movement along the track 34 (shown in broken line in FIG. 1) from the turning device 6 to the following press.

The program control mechanism which is schematically illustrated in FIG. 6 and which may be constructed in a manner known in the art is operated, in turn, by one of the presses in dependence on its position as is known in the art.

In the storage station turning device 6, the workpieces 5 can have imparted thereto, in addition to a pure turning or rotational motion, if necessary also auxiliary movements in the lifting and lowering sense and/or in or against the conveying direction, in order to place the workpieces 5 into the position advantageous for their further transportation. As shown in FIG. 1, the track 33 leads to one part of the turning device while the track 34 leads from another part of the turning device such that after delivery of the workpiece 5 to the turning station, the turning device 6 may be rotated under the control of the program mechanism so that the workpiece 5 assumes a reversed position for pickup and delivery to the subsequent press along track 34.

It is understood that the present invention is not limited to the above description and illustration but is susceptible of numerous changes and modifications as known to those skilled in the art, and we therefore do not wish to be limited to the details shown and described herein but intend to cover all such changes and modifications as are encompassed by the scope of appended claims.

We claim:

1. In combination with a press line having at least two presses, a transfer system transferring workpieces from a precessing station of one press to a processing station of a subsequent press, the transfer system comprising track means extending over the entire interspace between two successive presses, a single transfer slide means arranged for horizontal movement along said track means, at least one pair of gripper members pointing opposite directions and mounted on said transfer slide means for at least lifting and lowering movements and operating movements to grip and release the workpieces, a single storage station for the workpieces being disposed between the two successive presses, transfer drive means for controlling the movement of said transfer slide means in accordance with the travel path of said transfer slide means, and a reciprocating drive means for lifting and lowering said gripper members along the travel path of said transfer slide means, said transfer drive means and said reciprocating drive means being separate and independent of one another and being independently controllable of one another, said transfer drive means for controlling the movement of said transfer slide means being independent of the drives of the presses, and further comprising program control means for providing a variable program for effecting coordinated control of said transfer drive means, said reciprocating drive means and the operating movements of said gripper members at each of the presses and during transfers therebetween.

2. A press line according to claim 1, wherein said transfer drive means includes controllable motor means for driving at least one gear wheel provided in said transfer slide means, said track means having at least one rack member extending therealong and fixedly mounted thereto, said at least one gear wheel being arranged for meshing engagement with said at least one rack member.

3. A press line according to claim 2, wherein said reciprocating drive means includes piston-cylinder means mounted on said transfer slide means, said piston means being movable in said cylinder means in a direction transverse to the transfer direction.

4. A press line according to claim 3, wherein said transfer slide means includes a liftable and lowerable member connected to said piston means, and a pair of connecting members extending in opposite directions from said liftable and lowerable member, respective ones of said pair of said gripper members being attached to respective ones of said pair of connecting members.

5. A press line according to claim 4, wherein said track means includes an upper and a lower tubular member interconnected by a web member, and said transfer slide means includes upper and lower roller members for rolling engagement with the respective upper and lower tubular members of said track means.

6. A press line according to claim 1, wherein said transfer drive means includes controllable motor means for driving at least one feed screw nut provided in said transfer slide means, said track means having a nonrotatably mounted spindle member extending therealong, and said at least one feed screw nut being supported on said spindle member for movement with respect thereto.

7. A press line according to claim 1, wherein said transfer drive means includes controllable motor means for exterting a rotary drive on at least one spindle member extending along said track means, said transfer slide means having a feed screw nut mounted therein, said feed screw nut being supported on said at least one spindle member for movement with respect thereto.

8. A press line according to claim 1, wherein said transfer slide means includes controllable linear electric motor means having one fixedly mounted part extending along said track means and the other part mounted on said transfer slide means.

9. A press line according to claim 1, wherein said storage station includes a turning means responsive to said program control means for controlling the position thereof.

10. A press line according to claim 1, wherein said transfer slide means includes a liftable and lowerable member, and further comprising inclination means for connecting said grippers members to the liftable and lowerable member of said transfer slide means with an adjustable inclination with respect to the transfer direction.

11. A press line according to claim 1, wherein said transfer slide means includes a liftable and lowerable member, andfurther comprising inclination means for connecting said gripper members to said liftable and lowerable member of said transfer slide means with an adjustable inclination with respect to the transfer direction, and displacement drive means for displacing said gripper members with respect to said liftable and lowerable member, at least said displacement drive means being responsive to said program control means for controlling the displacement of said gripper members.

12. A press line according to claim 11, wherein said displacement drive means also serves for controlling the operation of said gripper members in response to said program control means.

13. A press line according to claim 1, further comprising inclination drive means for engaging said gripper members to change the inclination thereof with respect to the transfer direction in response to said program control means.

14. A press line according to claim 13, further comprising operating drive means for operating said gripper members, said operating drive means and said inclination drive means being controlled by said program control means in mutual dependency.

* * * * *